No. 785,677. Patented March 21, 1905.

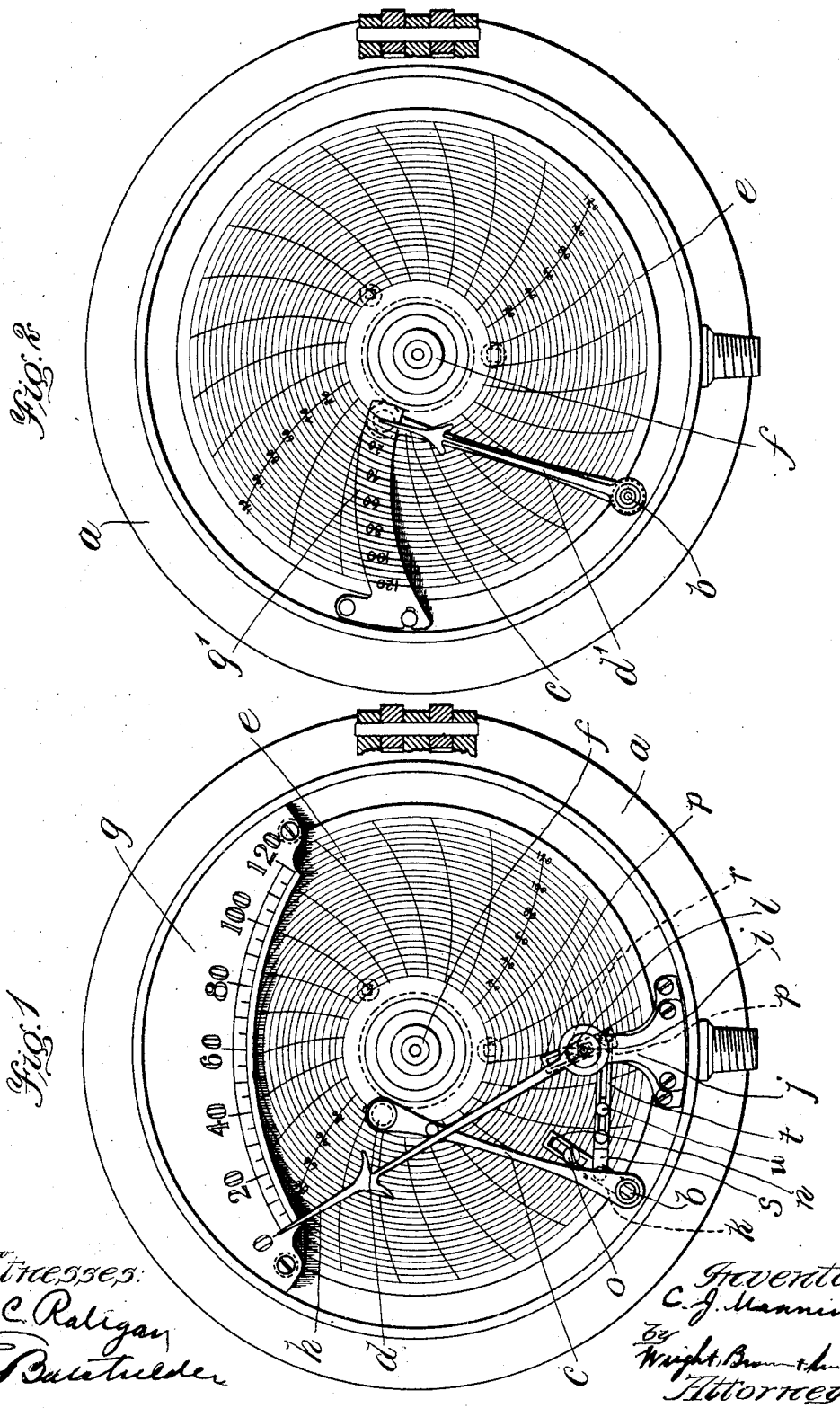

UNITED STATES PATENT OFFICE.

COLEMAN J. MANNING, OF MEDFORD, MASSACHUSETTS, ASSIGNOR TO AMERICAM STEAM GAUGE AND VALVE MANUFACTURING COMPANY, OF BOSTON, MASSACHUSETTS, A CORPORATION OF NEW JERSEY.

RECORDING-GAGE.

SPECIFICATION forming part of Letters Patent No. 785,677, dated March 21, 1905.

Application filed October 19, 1904. Serial No. 229,051.

*To all whom it may concern:*

Be it known that I, COLEMAN J. MANNING, of Medford, in the county of Middlesex and State of Massachusetts, have invented certain new and useful Improvements in Recording-Gages, of which the following is a specification.

The present invention relates to recording-gages which are provided with a continuous-moving surface—as a revolving dial, cylinder, &c.—and an indicator provided with a marking-point for making on the moving surface by means of a continuous line a permanent record of the pressure, temperature, humidity, or other quality or characteristic of steam, the atmosphere, &c., and changes therein during a period of time, and has for its object to provide a device of this character with a stationary scale and a movable indicator by which the condition of pressure, temperature, &c., at any particular instant may be readily determined.

The invention consists in the apparatus which I will now proceed to describe and claim.

Of the accompanying drawings, Figure 1 represents a face view of a gage, showing the preferred embodiment of my invention. Fig. 2 represents a similar view showing a modified form thereof.

The same reference characters indicate the same parts in both figures.

The drawings show my invention as applied to a gage for recording the pressures of steam.

In the drawings, $a$ represents the casing of a steam-gage of any ordinary construction having the usual internal mechanism which is adapted to be acted on by steam or fluid under pressure and is connected in any well-known desirable manner so as to operate a rock-shaft $b$, upon which is mounted an arm $c$. The free end of the arm $c$ carries a marking-point $d$, which may be a pencil or a fountain-pen and which rests upon the surface of a disk or dial $e$. The disk $e$ is mounted upon a central arbor $f$, which latter is adapted to be rotated by clockwork to revolve the disk at a uniform rate of speed, that here shown being adapted to make one complete rotation in twenty-four hours.

Concentric lines are made upon the disk to represent the pressures registered, while curved approximately radial lines having a curvature corresponding to the path of movement of the point $d$ indicate periods of time. The marking-point is placed in contact with the surface of the disk and is moved toward and away from the center of the latter by fluctuations in the pressures acting upon the gage, while the disk is rotated at a uniform speed, thus making a continuous line upon the surface of the disk, which constitutes a record of the pressures during the period of time in which the disk rotates.

Thus far the apparatus is similar to any of the well-known forms of recording-gage now in use. Such a gage is adapted only for making records of pressures during an extended period of time and does not clearly indicate the present pressure at any particular moment, because the end of the arm which carries the marking-point obscures the point of contact of the latter with the disk, so that the pressure at the moment when an observation is being made cannot be readily or accurately determined. My invention is designed to remedy this defect of the recording-gage by providing an auxiliary device by which the exact pressure indicated by the gage at any particular instant of time may be read quickly and accurately and comprises a scale $g$, having subdivisions corresponding to those made by the concentric circles on the disk, and a pointer $h$. The latter is pivoted at $i$ to a bracket $j$, fixed on the casing, the pivot being adjacent the periphery of the gage, and is operated simultaneously with the arm $c$ by means of a linkage consisting of an arm $k$, attached to the rock-shaft $b$, so as to move therewith, an arm $l$, connected to the pivot $i$, and a link $m$, adjustably connected to the respective arms.

The provision for adjusting the pointer relatively to the arm $c$ so that they will both give the same indications consists of a slotted bar $n$, clamped to the arm $k$ by a screw $o$, a similar bar $p$, connected to the arm $l$ by a clamp $r$, and a construction of the link which permits altering the length thereof, consisting of two members—a bar $s$, connected to the slotted bar $n$, and a slotted bar $t$, connected to the member $p$ and to the bar $s$ by a clamp $u$.

It will be evident from the construction described that as the arm $c$ is moved by variations of pressure to record such pressures on the disk the end of the pointer will be correspondingly moved at the same time and the adjustable connections between these parts can be so set that the indications given by each will be the same.

In Fig. 2 is shown a modified construction, in which the pointer $d'$ is shown as being mounted directly upon the end of the rockshaft $b$, which supports the arm $c$, so that the motions of the pointer and arm are identical. The scale $g'$ consists of a member clamped to the casing and extending toward the center thereof, being curved to correspond with the path of movement of the end of the pointer. Although this structure is simpler than that illustrated in Fig. 1, the latter structure is preferred, as the indications of the pointer upon the scale are more easily read. The line of graduations on this scale, it will be noted, is also curved to correspond to the path of movement of the end of the pointer.

Although I have illustrated my invention as being applied to a steam-pressure gage, it is evident that its application is not necessarily restricted to this form of device, but it is capable of being employed in connection with recording-gages of all descriptions, whether they are used for steam-pressures, atmospheric pressure, temperature, relative humidity of the atmosphere, or any other conditions or qualities of matter.

I claim—

1. In a recording-gage having a continuously-rotating disk, a pivoted arm carrying a marking-point in contact with the surface of the disk and actuated by variations in conditions of pressure, &c., to record such conditions on the disk, an auxiliary pointer separately pivoted at one side of the arm to the casing of the gage and having connections with the arm whereby the pointer is oscillated about its pivot, and a stationary scale curved to correspond to the path of movement of the pointer connected to the gage in the same case with the disk and projecting over a portion of the disk, the scale being suitably graduated, and the pointer coöperating therewith, to indicate the present condition of pressure, &c., at any particular instant.

2. In a recording-gage having a continuously-rotating disk, a pivoted arm carrying a marking-point in contact with the surface of the disk and actuated by variations in conditions of pressure, &c., to record such conditions on the disk, an auxiliary pointer pivoted to the gage-casing adjacent the periphery of the gage, an adjustable linkage connected to the arm and pointer, whereby motion may be given the latter by the former, and an auxiliary scale fixed to the casing of the gage on the side opposite to that where the pointer is pivoted and provided with graduations arranged on a line curved to correspond with the path of movement of the end of the pointer, the pointer and scale coöperating to indicate the present condition of pressure, &c., at any particular instant.

3. In a recording-gage, a continuously-rotating disk, a casing concentric with the disk and closely adjacent the periphery thereof, a pivoted arm carrying a marking-point in contact with the surface of the disk and actuated by variations in conditions of pressure, &c., to record such conditions on the disk, a segmental graduated scale affixed to the casing and projecting over a portion of the disk, a pointer pivotally connected to the casing beside the arm and diametrically opposite the central portion of the scale, the graduations of the scale being concentric with the pivot of said pointer and the distance between them greater than between the graduations of the disk, and a linkage adjustable in length and adjustably connected to the arm and pointer, whereby motion of the former is communicated to the latter, the pointer and segmental scale coöperating to indicate the present condition of pressure, &c., at any particular instant.

4. In a recording-gage, a continuously-rotating disk, a casing concentric with the disk and closely adjacent the periphery thereof, a pivoted arm carrying a marking-point in contact with the surface of the disk and actuated by variations in conditions of pressure, &c., to record such conditions on the disk, a segmental graduated scale affixed to the casing and projecting over a portion of the disk, a bracket mounted on the casing beside the arm and diametrically opposite the central portion of the scale, a pointer pivotally connected to said bracket, the graduations of the scale being concentric with the pivot of said pointer, and a linkage adjustable in length and adjustably connected to the arm and pointer, whereby motion of the former is communicated to the latter, the pointer and segmental scale coöperating to indicate the present condition of pressure, &c., at any particular instant.

5. In a recording-gage, a continuously-rotating disk, a casing concentric with the disk and closely adjacent the periphery thereof, a pivoted arm carrying a marking-point in contact with the surface of the disk and actuated by variations in conditions of pressure, &c., to record such conditions on the disk, a segmental graduated scale affixed to the casing and projecting over a portion of the disk extending substantially perpendicularly to a radius of the disk from one side to the other of the casing, a pointer pivotally connected to the casing beside the arm and diametrically opposite the central portion of the scale, the graduations of the scale being concentric with the pivot of said pointer, and a linkage adjustable in length and adjustably connected to the arm and pointer, whereby motion of the former is communicated to the latter, the pointer and segmental scale coöperating to indicate the present condition of pressure, &c., at any particular instant.

In testimony whereof I have affixed my signature in presence of two witnesses.

COLEMAN J. MANNING.

Witnesses:
 WM. E. JERAULD,
 C. F. BROWN.